United States Patent [19]

Arney et al.

[11] Patent Number: 4,749,364

[45] Date of Patent: Jun. 7, 1988

[54] DISPLAY ATTACHMENT APPARATUS

[75] Inventors: Michel D. Arney, Lowell; Douglas C. Dayton, Harvard, both of Mass.

[73] Assignee: Wang Laboratories, Inc., Lowell, Mass.

[21] Appl. No.: 36,161

[22] Filed: Apr. 7, 1987

Related U.S. Application Data

[63] Continuation of Ser. No. 841,909, Mar. 20, 1986, abandoned.

[51] Int. Cl.⁴ .......................................... H01R 13/639
[52] U.S. Cl. .................................................... 439/372
[58] Field of Search ............... 339/75 R, 75 M, 91 R; D14/106, 113, 114, 115; 340/700, 711; 439/345, 372

[56] References Cited

U.S. PATENT DOCUMENTS 2,944,864  7/1960  Krivulka ........................ 339/75 M
4,037,903  7/1977  Saner ............................. 339/75 R

FOREIGN PATENT DOCUMENTS 1151580  7/1963  Fed. Rep. of Germany .... 339/91 R

OTHER PUBLICATIONS

"The Visual Computer", Lamont Wood, Popular Computing, May 1985, pp. 86-89.
"Computing on the Run", Roland Racko, PC Magazine, vol. 4, No. 6, Mar. 19, 1985, pp. 188-192.
"Good is not Good Enough", Jon Pepper, PC Magazine, vol. 4, No. 17, Aug. 20, 1985, pp. 165-168.

Primary Examiner—John McQuade
Attorney, Agent, or Firm—Michael H. Shanahan; Gordon E. Nelson

[57] ABSTRACT

Apparatus for removably attaching display apparatus such as an LCD screen to electrical apparatus. The attachment apparatus provides for electrical and mechanical attachment and detachment of the display apparatus in a single operation. When the display apparatus is detached, the attachment apparatus also provides for attachment of different display apparatus to the electrical apparatus. The attachment apparatus consists of a socket including a male electrical connector and a plug including a female electrical connector. When the plug is inserted into the socket, the male and female electrical connectors are connected, thereby providing power and signals to the display apparatus. The plug is held in the socket by means of a lever-actuated friction mechanism.

2 Claims, 2 Drawing Sheets

APPARATUS WITH DETACHABLE DISPLAY

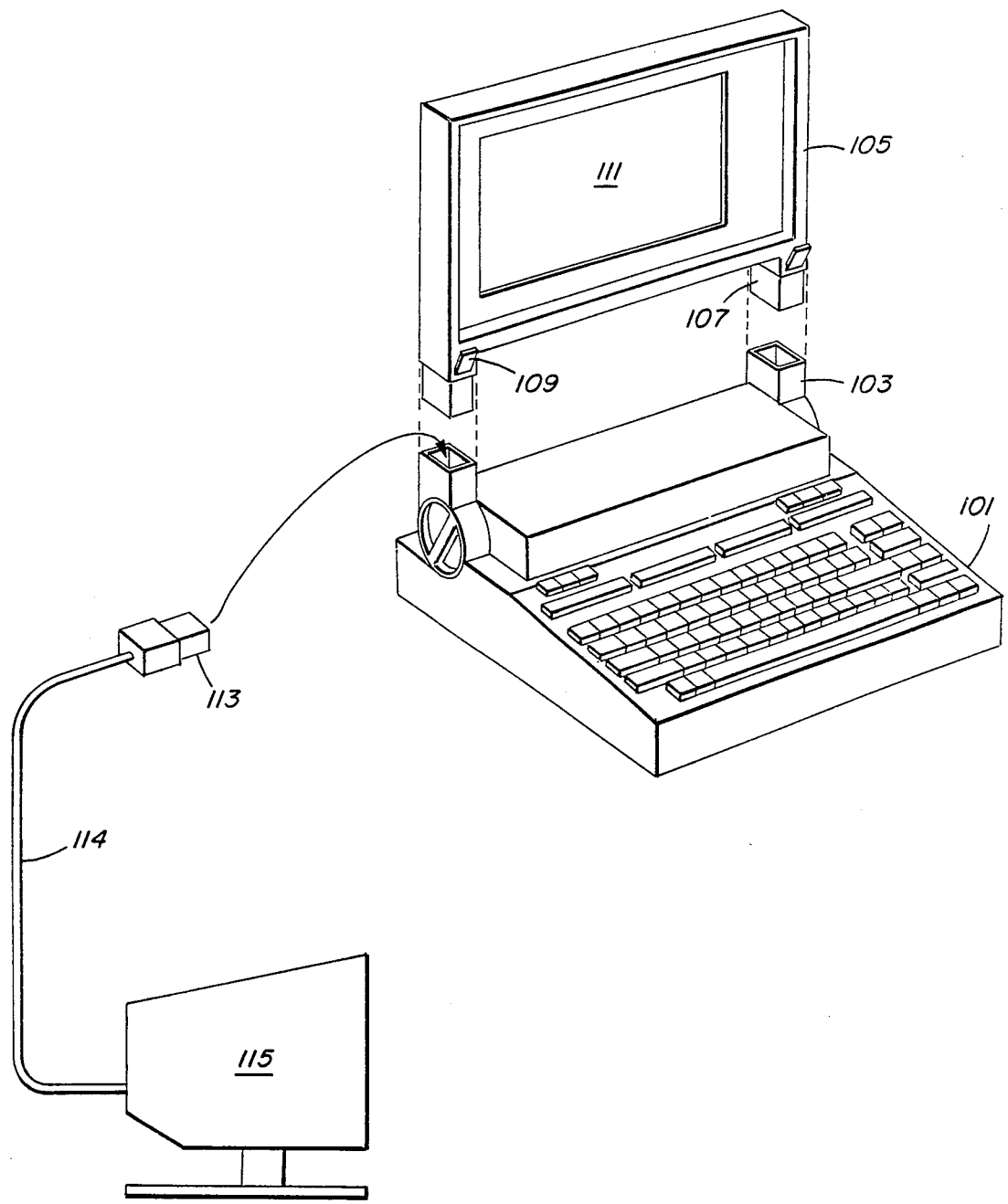
FIG. 1: APPARATUS WITH DETACHABLE DISPLAY

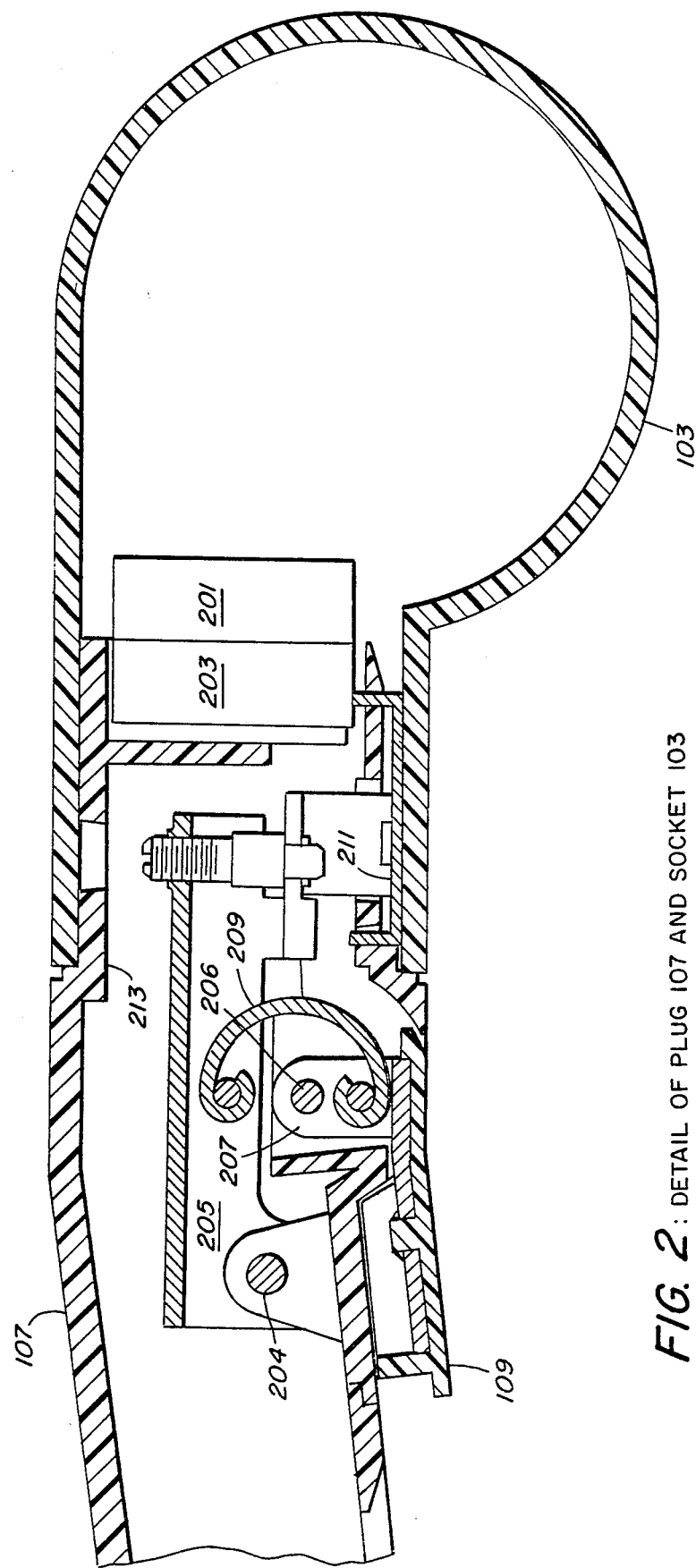
FIG. 2: DETAIL OF PLUG 107 AND SOCKET 103

4,749,364

DISPLAY ATTACHMENT APPARATUS

This is a continuation of co-pending application Ser. No. 841,909 filed on Mar. 20, 1986, and now abandoned.

BACKGROUND OF THE INVENTION

1. Field of the Invention

The invention relates to visual display apparatus of the type used to display input to and/or output from electronic devices such as computers, computer terminals, electronic test equipment, or electronic typewriters. More specifically, the invention relates to visual display apparatus which is easily detachable from the apparatus for which it serves as a display.

2. Description of the Prior Art

The display apparatus generally used with electronic devices such as computers or terminals has as its display element a cathode ray tube (CRT). CRT displays are cheap, trouble-free, and provide a high-quality display. However, in portable electronic devices, the display apparatus generally employs a LCD display as its display element. LCD displays are generally more expensive than CRT displays and provide a lower-quality display, but these disadvantages are overcome by the fact that they have lower power consumption, are much less bulky, and are more resistant to shock and vibration than CRT displays.

The low quality of the display remains a drawback of the portable electronic device, particularly, when, as is often the case, the portable electronic device is used in an environment such as an office where the portable electronic device may be plugged in and where a CRT display is available. In order to permit the use of a higher-quality display apparatus where possible, some manufacturers of portable electronic devices have provided a jack which receives a plug from a CRT display. When the CRT display is available, the user can plug it into the jack and use it instead of the LCD display.

Since the LCD display is not needed when the CRT display is being used and indeed often gets in the user's way when he is using the CRT display, some manufacturers of portable electronic devices have also provided LCD displays which are easily removable from the portable computer. An example of such a prior-art portable electronic device is the Visual Commuter portable computer, manufactured by Visual Computer, Inc. The Visual Commuter's LCD display is physically attached to the CPU case by means of a screw lock connector, and there is a separate cable which plugs into a jack in the CPU case and which provides the electrical connections between the LCD display and the CPU. Removing the LCD display thus involves two operations: unplugging the cable and then physically detaching the LDC display from the CPU case. Reattaching the LCD display is of course the reverse of removing it.

While the detachable LCD displays of the prior art are serviceable, they are unnecessarily difficult to use. The physical and electrical disconnection or connection of the LCD display to the remainder of the apparatus it is used with are separate operations and the physical connection is unnecessarily cumbersome. The invention described herein solves the above problems of the prior art by providing a detachable display apparatus in which physical and electrical connections are made in a single easy operation.

SUMMARY OF THE INVENTION

The present invention is attachment apparatus for removably attaching display apparatus to apparatus such as the CPU of a portable computer, the keyboard of a portable terminal, or the keyboard of an electronic typewriter. The attachment apparatus includes first attachment means on the display apparatus and second attachment means on the apparatus to which the display apparatus is attached. The two attachment means cooperate to provide both mechanical and electrical attachment of the display apparatus to the apparatus to which it is attached and consequently permit both electrical and mechanical attachment or detachment in a single operation.

In a preferred embodiment of the invention, either the first or second attachment means is a socket and the other attachment means is a plug, and both the mechanical and the electrical attachment or detachment is achieved by plugging the plug into the socket. Further, the plug in a preferred embodiment includes lever-activated means for engaging the socket. A preferred embodiment of the lever-activated means for engaging the socket include a pivotable cam connected to the plug, a first lever connected to the cam, a second lever pivotably connected to the plug, socket engaging means connected to the second lever, and elastic means connected between the cam and the second lever. When the cam is pivoted by moving the first lever, the elastic means acts on the second lever to cause the socket engaging means to engage the socket, and when the socket engaging means has engaged the socket, the elastic means acts on the cam to hold the cam in pivoted position.

In another aspect of the invention, a display such as a CRT display may be used in place of the removable display by plugging a plug connected by a cable to the CRT display into the socket used to attach the removable display apparatus to the apparatus to which it belongs.

It is thus an object of the invention to provide improved apparatus for attaching a visual display to or detaching it from the apparatus to which it belongs.

It is another object of the invention to provide attaching or detaching apparatus which provides both electrical and mechanical attachment of the visual display to the apparatus to which it belongs.

It is a further object of the invention to provide attaching or detaching apparatus which permits attachment of a separate visual display when the visual display belonging to the apparatus is detached.

It is an additional object of the invention to provide lever-operated attaching or detaching apparatus.

Additional advantages and objects of the invention will become clear to those skilled in the art upon reading the following Description of a Preferred Embodiment and studying the Drawing, wherein

BRIEF DESCRIPTION OF THE DRAWING

FIG. 1 is a perspective drawing of a portable computer which includes a display incorporating the invention;

FIG. 2 is a detailed cross section of a portion of a presently-preferred embodiment of the invention.

DETAILED DESCRIPTION OF A PREFERRED EMBODIMENT

1. Overview of a Preferred Embodiment: FIG. 1

A presently-preferred embodiment of the invention is employed to attach an LCD display to a portable computer designed by Wang Laboratories, Inc. FIG. 1 is a perspective drawing of portable computer CPU and keyboard 101 and detached LCD display 105. Beginning with display 105, display 105 is a panel which has on one side LCD screen 111. Two plugs 107 integral to the panel serve to attach display 105 to portable computer 101. Each plug 107 includes a lever 109 which is pulled out to release an attached display 105 from portable computer 101 and pushed in to lock the attached display 105 to portable computer 101. One of the plugs further contains a female electrical connector (not shown in FIG. 1). Lines connected to the electrical connector provide power and control signals to LCD display 105.

Plugs 107 are received by sockets 103 in portable computer 101. The socket corresponding to the plug containing the female electrical connector contains a male electrical connector located in such fashion that when the corresponding plug is inserted in the socket, a connection is established between the male and female electrical connectors. The male electrical connector receives power and control signals for LCD screen 111 from portable computer 101, and the power and control signals are provided via the female connector to LCD display 111. In a presently-preferred embodiment, sockets 103 are joined to the base about by an axis upon which they pivot, whereby users of computer 101 may fold attached display 105 down over the keyboard of computer 101 or adjust the angle relative to the vertical of display 105.

Operation of the invention is as follows: to attach display 105 to portable computer 101, the user of portable computer 101 pivots sockets 103 until they are at a convenient angle. The user then takes display 105, pulls out levers 109, and inserts plugs 107 into their corresponding sockets 103. After inserting the plugs, the user pushes levers 109 in to lock the plugs into the sockets. Since the insertion of plugs 107 into sockets 103 also connected the female and male connectors, display 105 is ready to operate. Detachment of display 105 from portable computer 101 is the reverse: the user again adjusts display 105 to a convenient angle, pulls out levers 109, which unlocks plugs 107 from sockets 103, and pulls up on display 105, which pulls plugs 107 out of sockets 103 and both mechanically and electrically detaches display 105 from portable computer 101.

As mentioned above, a user of portable computer 101 will generally detach display 105 so that he can use portable computer 101 with a CRT display. As shown in FIG. 1, in a preferred embodiment, CRT display 115 is attached to portable computer 101 by means of cable 114 and plug 113, which fits into socket 103 containing the male connector. Like plug 107, plug 113 in a preferred embodiment has a female connector, and when plug 113 is inserted into socket 103, a connection is established between the male and female connectors and the control power and the control signals from portable computer 101 go to CRT display 115 via plug 113 and cable 114. CRT display 115 may be disconnected from portable computer 101 simply by removing plug 113 from socket 103. In a preferred embodiment, plug 113 is not physically locked into socket 103. Moreover, socket 103 may be rotated so that it points straight away from the user of computer 101, thereby ensuring that cable 114 is out of the way of computer 101 when plug 113 is attached.

2. Detailed Description of Plug 107 and Socket 103 in a Preferred Embodiment: FIG. 2

FIG. 2 is a longitudinal cross section of plug 107 and socket 103 when display 105 is attached to portable computer 101 and lever 109 is pushed in, locking plug 107 into socket 103. Beginning with socket 103, socket 103 in a preferred embodiment has an opening with a rectangular cross section. At the bottom of the opening in socket 103 is male connector 201, which is connected electrically to the CPU of portable computer 101. Continuing with plug 107, the portion of plug 107 which fits into socket 103 has a corresponding rectangular cross section. At the bottom of plug 107, in a position at which it will engage male connector 201, is female connector 203, which is connected electrically to LCD screen 111. Thus, when plug 107 is inserted into socket 103, LCD screen 111 is electrically connected to the CPU of computer 101 and electrically disconnected when plug 107 is removed from socket 103. Three sides of the plug, including side 213 of FIG. 2, are fixed, while the fourth side, 211, is laterally movable and serves to lock plug 107 into socket 103.

The locking mechanism is the following: Side 211 is connected to lever 205, which is further connected to plug 107 by means of pivot 204. Lever 205 moves on pivot 204 in response to spring 209, which in turn is connected to cam 207. In a preferred embodiment, spring 209 is stiff and can move lever 205 in both directions on pivot 204. Cam 207 is connected to plug 107 by means of pivot 206. Lever 109, finally, is rigidly connected to cam 207. The locking mechanism operates to hold plug 107 in socket 103 as follows: when plug 107 is inserted in socket 103 and lever 109 is pushed up, cam 207 pivots on pivot 206 and puts tension on spring 209. Spring 209 then pulls lever 205 towards cam 207, which in turn forces side 211 against the side of socket 103, thereby retaining plug 107 in socket 103. At the same time, spring 209 acting on cam 207 holds lever 109 in its pushed in position. The lock is released by pulling lever 109 down. When that occurs, cam 207 pivots, releasing the tension on spring 209. Spring 209 now pushes lever 205 away from cam 207 and side 211 disengages itself from the wall of socket 103, releasing plug 107.

Plug 113 in a preferred embodiment does not have the lever-action engaging and releasing mechanism of plug 107. Instead, it simply has a female connector like female connector 203 of plug 107 in the proper position to engage male connector 201 when plug 113 is inserted in socket 103.

While the embodiment of FIGS. 1 and 2 are a presently-preferred embodiment of the invention, many other variations of the invention will be apparent to those skilled in the art. There may be a different number of points of attachment between the display and the apparatus to which it belongs than the two points disclosed here; in some embodiments, the combined electrical-mechanical connecting system may employ an arrangement other than a plug and a socket; in some embodiments using the plug and socket the socket and plug may have other cross sections; moreover, some embodiments may not require a mechanism to lock the plug into the socket; in embodiments which do employ a locking mechanism, mechanisms other than the lever-actuated one disclosed herein may be employed, and the lever-actuated mechanism itself may have a different geometry from that disclosed herein. The preferred embodiment disclosed herein is thus to be regarded as purely exemplary, and the scope of the invention is to be governed solely by the appended claims as interpreted to the breadth permitted by the doctrine of equivalents.

What is claimed is:

1. Apparatus for retaining a plug in a socket having a recess to receive the plug comprising:
   a cam pivotably connected to the plug;
   a first lever having one end fixedly connected to the cam;
   a second lever pivotably connected to the plug;
   engaging means connected to the second lever; and
   elastic means connecting the cam and the second lever and providing the sole means by which motion is transferred between the cam and the second lever for acting on the second lever when the first lever pivots the cam to urge the engaging means against a wall of the recess and acting on the cam to hold the cam in pivoted position when the engaging means is urged against the wall.

2. A portable computer comprising:
   a base for housing a Central Processing Unit, (CPU), for processing data and an input means for entering data into the CPU,
   display means for viewing data associated with the CPU including plug means, and
   rotatable socket means pivotably coupled to the base including engaging means for mating with said plug means in a mechanical union for supporting the display means and providing for rotatable movement relative to the base,
   said socket means including first electrical connector means electrically coupled to the base for coupling electrical power and signals between the base and the electrical connector means,
   said plug means including second electrical connector means coupled to the display means for coupling electrical power and signals between the first electrical connector means and the display means,
   whereby the display means and base are mechanically and electrically coupled and decoupled from each other, respectively, by mating and separating the plug means and the socket means.

* * * * *